(12) United States Patent
Stoppenbrink et al.

(10) Patent No.: US 11,187,378 B2
(45) Date of Patent: Nov. 30, 2021

(54) POWER TOOL SAFETY SYSTEM

(71) Applicant: LAGUNA TOOLS, INC., Irvine, CA (US)

(72) Inventors: David Stoppenbrink, Tacoma, WA (US); Torben Helshoj, Laguna Beach, CA (US); Stephen Stoppenbrink, San Clemente, CA (US)

(73) Assignee: LAGUNA TOOLS, INC., Irvine, CA (US)

( * ) Notice: Subject to any disclaimer, the term of this patent is extended or adjusted under 35 U.S.C. 154(b) by 92 days.

(21) Appl. No.: 16/533,538

(22) Filed: Aug. 6, 2019

(65) Prior Publication Data
US 2020/0072413 A1 Mar. 5, 2020

Related U.S. Application Data

(60) Provisional application No. 62/724,324, filed on Aug. 29, 2018.

(51) Int. Cl.
*F16P 3/00* (2006.01)
*F16P 3/14* (2006.01)
(Continued)

(52) U.S. Cl.
CPC .......... *F16P 3/142* (2013.01); *B23Q 11/0082* (2013.01); *B23Q 11/0092* (2013.01); *G01S 17/04* (2020.01); *G01V 8/22* (2013.01)

(58) Field of Classification Search
CPC ...... F16P 3/142; G01S 17/04; B23Q 17/2438; B23Q 11/0082; B23Q 11/0092; G01V 8/22
See application file for complete search history.

(56) References Cited

U.S. PATENT DOCUMENTS

| 4,996,742 A | 3/1991 | Townsend |
| 5,921,367 A | 7/1999 | Kashioka et al. |

(Continued)

FOREIGN PATENT DOCUMENTS

| CN | 107423720 A | * 12/2017 |
| DE | 3501021 A | 7/1985 |

(Continued)

OTHER PUBLICATIONS

Lien et al, Model-based articulated hand motion tracking for gesture recognition, Image and Vision Computing 16 (1998) 121-134 (Year: 1998).*

(Continued)

*Primary Examiner* — Ping Y Hsieh
*Assistant Examiner* — Xiao Liu
(74) *Attorney, Agent, or Firm* — Roeder & Broder LLP; James P. Broder

(57) ABSTRACT

A safety system, for use with a power tool, includes a sensor assembly and a controller. The power tool includes a base and a moving component that is movable relative to the base. The sensor assembly monitors a predetermined danger zone that is adjacent to the moving component of the power tool. The sensor assembly is configured to generate data relating to the predetermined danger zone. The controller receives the data from the sensor assembly and analyzes the data from the sensor assembly to determine if at least a portion of a hand of the user is present within the predetermined danger zone. The safety system can further include a wearable component including infrared only reflective material that is coupled to the hand of the user. The controller analyzes the data from the sensor assembly to determine if the wearable component is present within the predetermined danger zone.

20 Claims, 10 Drawing Sheets

(51) Int. Cl.
*B23Q 11/00* (2006.01)
*G01V 8/22* (2006.01)
*G01S 17/04* (2020.01)

(56) References Cited

U.S. PATENT DOCUMENTS

| | | |
|---|---|---|
| 7,049,967 B2 | 5/2006 | Grasselli et al. |
| 7,924,164 B1 | 4/2011 | Staerzl |
| 2008/0245200 A1 | 10/2008 | Campbell |
| 2010/0300256 A1* | 12/2010 | Loewe ................ B27G 19/02 |
| | | 83/72 |
| 2018/0099369 A1* | 4/2018 | Eastling ................ H04N 7/181 |
| 2018/0147658 A1* | 5/2018 | Shapiro ................ B23K 26/04 |
| 2018/0243848 A1 | 8/2018 | Guynn et al. |
| 2020/0056742 A1* | 2/2020 | Bohning ................ F16P 3/142 |

FOREIGN PATENT DOCUMENTS

| | | |
|---|---|---|
| FR | 002779669 A1 | 12/1999 |
| FR | 002786068 A1 | 5/2000 |

OTHER PUBLICATIONS

Mazumdar et al, Gloved and free hand tracking based hand gesture recognition, ICETACS 2013, pp. 197-202 (Year: 2013).*

Molchanov et al, Hand gesture recognition with 3D convolutional neural networks, CPVR, pp. 1-7 (Year: 2015).*

* cited by examiner

POWER TOOL SAFETY SYSTEM

RELATED APPLICATION

This application claims priority on U.S. Provisional Application Ser. No. 62/724,324 filed on Aug. 29, 2018, and entitled "POWER TOOL SAFETY SYSTEM". As far as permitted, the contents of U.S. Provisional Application Ser. No. 62/724,324 are incorporated in their entirety herein by reference.

BACKGROUND

Power tools of many varieties are used by millions of individuals on a regular or periodic basis. Unfortunately, power tools can be very dangerous if used improperly or just by their inherent nature. For example, a power tool such as a power saw or power drill can easily and potentially severely injure the hand or fingers of a user, including loss of digits and worse, if the hand or fingers get too close to and/or contact the saw blade or drill bit during use of the power tool. As a further example, when using a power saw, the user physically holds an object to be cut and moves the object into the moving saw blade so that the object can be cut. This inherently places the user at risk of contacting the saw blade in the event of slipping or as a result of inattention. While guards can be used to cover portions of the saw blade, a portion of the saw blade still remains exposed to the user.

Thus, it is desired to provide a safety system for use with power tools that can effectively inhibit or at least mitigate the severity of injury to the user during use of the power tools. More specifically, in certain applications, it is desired to provide a safety system for use with power tools that will automatically shut down (or power off) the power tool and rapidly stop movement of moving components of the power tool if the hand or fingers of the user get too close to the moving components of the power tool.

SUMMARY

The present invention is directed toward a safety system for use with a power tool that is usable by a user, the power tool including a base and a moving component that is movable relative to the base. In various embodiments, the safety system includes a sensor assembly and a controller. The sensor assembly monitors a predetermined danger zone that is adjacent to the moving component of the power tool. The sensor assembly is configured to generate data relating to the predetermined danger zone. The controller receives the data from the sensor assembly and analyzes the data from the sensor assembly to determine if at least a portion of a hand of the user is present within the predetermined danger zone.

In some embodiments, the safety system further includes a wearable component that is configured to be coupled to the hand of the user. The wearable component includes infrared only reflective material. In such embodiments, the controller analyzes the data from the sensor assembly to determine if the wearable component is present within the predetermined danger zone. In certain such embodiments, the wearable component includes black infrared only reflective material.

Additionally, in certain embodiments, the sensor assembly includes a first sensor that monitors a first region that is adjacent to the moving component of the power tool and generates first data relating to the predetermined danger zone, and a second sensor that monitors a second region that is adjacent to the moving component of the power tool and generates second data relating to the predetermined danger zone. In such embodiments, the controller compares the first data from the first sensor and the second data from the second sensor to determine if the wearable component is present within the predetermined danger zone. In some such embodiments, the first region intersects the second region to define a common region, and the predetermined danger zone is based on the common region.

In some embodiments, the first sensor is a first sensor type and the second sensor is a second sensor type that is different than the first sensor type. For example, in one such embodiment, the first sensor is a red blue green input device, and wherein the second sensor is a no infrared filter input device.

Additionally, in certain embodiments, the safety system further includes a braking system that is configured to selectively stop movement of the moving component of the power tool relative to the base. In such embodiments, if the controller determines that the wearable component is present within the predetermined danger zone, the controller transmits a signal to the braking system to stop movement of the moving component of the power tool relative to the base.

Alternatively, in other embodiments, the sensor assembly includes a first sensor that captures at least one hand image prior to the user using the power tool, and a second sensor that monitors the predetermined danger zone that is adjacent to the moving component of the power tool and generates the data relating to the predetermined danger zone. In such embodiments, the controller generates a detection algorithm that is based at least in part on the at least one hand image that is captured by the first sensor prior to the user using the power tool. Additionally, the controller analyzes the data from the second sensor utilizing the detection algorithm to determine if the at least a portion of the hand of the user is present within the predetermined danger zone. Further, in some such embodiments, the first sensor captures a plurality of hand images prior to the user using the power tool; and the controller generates the detection algorithm based at least in part on the plurality of hand images that are captured by the first sensor prior to the user using the power tool.

In certain embodiments, the first sensor is the same as the second sensor.

Further, in some embodiments, the safety system further includes a braking system that is configured to selectively stop movement of the moving component of the power tool relative to the base. In such embodiments, if the controller determines that the at least a portion of the hand is present within the predetermined danger zone, the controller transmits a signal to the braking system to stop movement of the moving component of the power tool relative to the base.

The present invention is further directed toward a method for protecting a hand of a user during use of a power tool, the power tool including a base and a moving component that is movable relative to the base, the method including (i) monitoring a predetermined danger zone that is adjacent to the moving component of the power tool with a sensor assembly; (ii) generating data relating to the predetermined danger zone with the sensor assembly; (iii) receiving the data from the sensor assembly with a controller; and (iv) analyzing the data from the sensor assembly with the controller to determine if at least a portion of a hand of the user is present within the predetermined danger zone.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a power tool safety system (also sometimes referred to herein simply as a "safety system") for protecting a user during use of a power tool. In various embodiments, the safety system is configured to inhibit and/or minimize injury to the user during use of the power tool, e.g., by automatically shutting down and/or ceasing movement of a moving component of the power tool when certain conditions are sensed. More specifically, in such embodiments, the safety system can be configured to sense, recognize and/or identify the presence of a portion of the user, e.g., a hand or a portion of a hand of the user, within a predetermined area that is positioned near to, adjacent to, and/or substantially encircles the moving component of the power tool. The safety system can further automatically shut down and stop operation of the power tool upon sensing, recognizing and/or identifying the portion of the user within the predetermined area that is positioned near to, adjacent to, and/or substantially encircles the moving component of the power tool.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
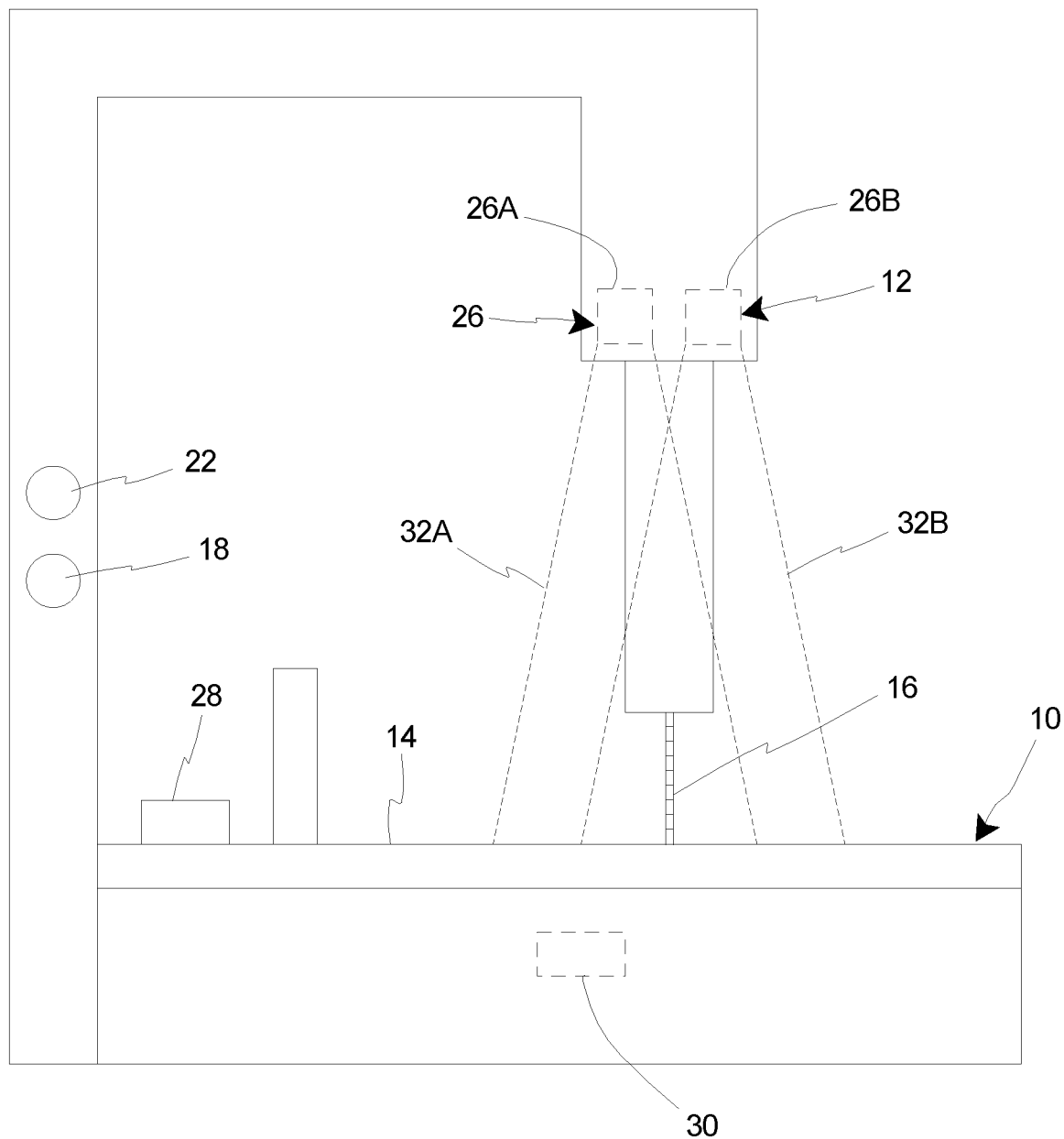
FIG. 1A is a simplified schematic front view illustration of a power tool, and a portion of an embodiment of a power tool safety system having features of the present invention that is usable with the power tool.

FIG. 1A is a simplified schematic front view illustration of a power tool 10, and a portion of an embodiment of a power tool safety system 12 (also referred to herein simply as a "safety system") having features of the present invention that is usable with the power tool 10.

As provided herein, the safety system 12 can be used with any suitable power tool 10. For example, in certain non-exclusive alternative applications, the safety system 12 can be used with a band saw, a table saw, a circular saw, a miter saw, or a drill press. Alternatively, the safety system 12 can be used with any other suitable power tool 10. Thus, although various Figures provided herewith illustrate the safety system 12 being used specifically with a band saw, such use is not intended to be limiting in any manner.

As shown in FIG. 1A, the power tool 10 includes a base 14 and a moving component 16, e.g., a saw blade or a drill bit, that is movable relative to the base 14. In particular, during use of the power tool 10, the power tool 10 can be moved between a non-operating condition, where the moving component 16 is not moving relative to the base 14, and an operating condition, where the moving component 16 is moving relative to the base 14 so as to enable the power tool 10 to perform its desired function. Additionally, as illustrated, the power tool 10 can further include an on/off (power) switch 18 that can be selectively activated by a user 20 (illustrated in FIG. 1D) to selectively move the power tool 10 between the non-operating condition (i.e. the "off" condition) and the operating condition (i.e. the "on" condition). Further, in certain embodiments, the power tool 10 can also include a safety cutoff switch 22 that can be selectively activated by the user 20 for manually activating a braking system for rapidly stopping movement of the moving component 16 relative to the base 14. The safety cutoff switch 22 is also usable to selectively energize and de-energize the power tool 10 and the safety system 12.

As noted above, the safety system 12 is configured to protect the user 20, i.e. to inhibit and/or minimize injury to the user 20, during use of the power tool 10. In various embodiments, the safety system 12 is configured to automatically shut down the power tool 10, i.e. by automatically stopping movement of the moving component 16 relative to the base 14, when certain conditions exist and/or are sensed in relation to the power tool 10.

The design of the safety system 12, and the positioning of the various components of the safety system 12 can be varied to suit the specific requirements of the power tool 10 with which the safety system 12 is being used. In various embodiments, the safety system 12 can be configured to include one or more of a wearable component 24 (illustrated, for example, in FIG. 1D), a sensor assembly 26, a controller 28, and a braking system 30. Alternatively, it is understood that the safety system 12 can include additional components or fewer components than what is illustrated in the Figures. For example, in certain non-exclusive alternative embodiments, the safety system 12 can be configured for use without the specific need for the wearable component 24. Still alternatively, one or more of the components of the safety system 12 can be positioned in a different manner than what is shown in the Figures.

As provided herein, in various embodiments, the wearable component 24 is configured to be coupled to and/or worn by the user 20 during use of the power tool 10. The wearable component 24 can be provided in any suitable form for use by the user 20. In various embodiments, the wearable component 24 is configured to cover at least a portion of a hand 20A (illustrated in FIG. 1D) of the user 20. For example, in some such embodiments, as shown in FIG. 1D, the wearable component 24 can be provided in the form of a glove that is to be worn on the hand 20A of the user 20, and covers substantially the entirety of the hand 20A of the user 20, during use of the power tool 10. Alternatively, the wearable component 24 can be configured to be worn by the user 20 such that it covers less than the entirety of the hand 20A of the user 20. For example, in one non-exclusive alternative embodiment, the wearable component 24 can be provided in the form of a finger-tip cover that is configured to be worn on only a single finger-tip 20B (illustrated in FIG. 2) of the hand 20A of the user 20.

Additionally, the wearable component 24 can be formed from any suitable materials and/or can be any suitable colors. As provided herein, in various embodiments, the wearable component 24 is made from materials and/or includes colors that can be sensed and/or identified by the safety system 12, i.e. the sensor assembly 26 and/or the controller 28. For example, in certain embodiments, the wearable component 24 can include an infrared only reflective material or pigment, e.g., a black infrared only reflective material. Alternatively, the wearable component 24 can be formed from or include different materials and/or different colors than those specifically noted herein, provided that such materials and/or colors can be readily sensed or identified by the sensor assembly 26 and/or the controller 28.

The sensor assembly 26 is configured to sense and/or detect the presence of the wearable component 24, and thus the presence of at least a portion of the hand 20A of the user 20, i.e. in a position near and/or adjacent to the moving component 16 of the power tool 10. In some embodiments, the sensor assembly 26 is coupled to the power tool 10 such that the sensor assembly 26 is substantially fixed in position relative to the power tool 10, i.e. at least relative to the base 14 of the power tool 10, during use of the power tool 10. More particularly, in alternative such embodiments, the sensor assembly 26 can be fixedly coupled to the power tool 10 or the sensor assembly 26 can be removably coupled to the power tool 10. Still alternatively, the sensor assembly 26 can be provided independently from the power tool 10, but can still be configured to be fixed in position relative to the power tool 10, i.e. at least relative to the base 14 of the power tool 10, so as to be effectively usable with the power tool 10.

The design of the sensor assembly 26 can be varied to suit the requirements of the safety system 12. In the embodiment illustrated in FIG. 1A, the sensor assembly 26 includes a first sensor 26A and a second sensor 26B that are each positioned and configured to monitor and/or sense within an area or region that is positioned near to, adjacent to, and/or that substantially encircles the moving component 16 of the power tool 16. In certain embodiments, the first sensor 26A can be a first sensor type, and the second sensor 26B can be a second sensor type that is different than the first sensor type. For example, in one such embodiment, the first sensor 26A can be a red blue green (RBG) input device, e.g., camera or other suitable input device, that is positioned and oriented to monitor a first region 32A, e.g., to capture images (pixels) within the first region 32A, that is positioned near to, adjacent to, and/or that substantially encircles the moving component 16 of the power tool 10; and the second sensor 26B can be a no infrared filter (NoIR) input device, e.g., a camera or other suitable input device, that is positioned and oriented to monitor a second region 32B, e.g., to capture images (pixels) within the second region 32B, that is positioned near to, adjacent to, and/or that substantially encircles the moving component 16 of the power tool 10. Additionally, as provided herein, the first sensor 26A and the second sensor 26B can be further configured to generate data relating to the first region 32A and the second region 32B, respectively, that can be transmitted to the controller 28. Alternatively, the first sensor 26A and/or the second sensor 26B can have a different design.

It is appreciated that the use of the terms "first sensor" and "second sensor" is merely for convenience and ease of illustration, and either sensor 526A, 526B can be referred to as the "first sensor" and/or the "second sensor".

In certain embodiments, the controller 28 can be coupled to the power tool 10, i.e. to the base 14 of the power tool 10. Alternatively, the controller 28 can be provided remotely from the power tool 10.

As provided herein, the controller 28 is configured to receive and analyze input (e.g., data) from the sensor assembly 26, e.g., the images (pixels) captured by the first sensor 26A and the second sensor 26B, to determine when the wearable component 24 is within a predetermined danger zone 34 (also sometimes referred to herein as the "danger zone") that is established near to, adjacent to, and/or that substantially encircles the moving component 16 of the power tool 10. As such, the controller 28 can analyze the input, data and/or images from sensors 26A, 26B to determine when at least a portion of the hand 20A of the user 20 is within the predetermined danger zone 34. With such design, the sensor assembly 26 and/or each of the sensors 26A, 26B can be said to be usable for monitoring the predetermined danger zone 34.

Additionally, during use of the power tool 10 and the safety system 12, the controller 28 can be used in what is sometimes referred to herein as a "glove-sensing mode" or "component-sensing mode", as well as what is sometimes referred to herein as a "collision detection mode". For example, when the controller 28 is in a mode for determining when the wearable component 24 is within the predetermined danger zone 34, but the power tool 10 is not running, then the controller 28 can be said to be in the glove-sensing mode or the component-sensing mode. Conversely, when the controller 28 is in a mode for determining when the wearable component 24 is within the predetermined danger zone 34, and the power tool 10 is running, then the controller 28 can be said to be in the collision detection mode.

As described in greater detail herein below, it is appreciated that in embodiments of the safety system 12 that do not include the wearable component 24, the sensor assembly 26 can be configured to sense and/or detect the presence of the hand 20A of the user 20 (or at least a portion of the hand 20A of the user 20) in a position near and/or adjacent to the moving component 16 of the power tool 10. Further, in such embodiments, the controller 28 can be configured to receive and analyze input (data) from the sensor assembly 26 to determine when the hand 20A of the user 20 (or at least a portion of the hand 20A of the user 20) is within the predetermined danger zone 34 near and/or adjacent to the moving component of the power tool 10.

The controller 28 and the circuitry provided therewith can have any suitable design. For example, in some embodiments, the controller 28 includes a single board computer (SBC) having one or more processors or circuits for purposes of analyzing the input, data and/or images (i.e. the pixels within the corresponding regions 32A, 32B) generated and/or captured by the first sensor 26A and the second sensor 26B.

Additionally, in certain embodiments, the controller 28 can incorporate one more visual outputs, e.g., LED lights, that alert the user 20 regarding the status of the power tool 10 and/or the safety system 12. For example, in such embodiments, the controller 28 can include visual outputs indicative that the power tool 10 is in a no start (non-operating) condition, a can start condition, and a running (operating) condition; as well as a visual output regarding activation of the safety system 12, i.e. identifying a collision detection when the wearable component 24 is determined to be within the danger zone 34. In certain embodiments, it is further appreciated that the safety system 12 and/or the controller 28 can be configured to sense or monitor movement of the user 20, e.g., at least a portion of the hand 20A of the user 20, near or within the predetermined danger zone 34. For example, in some such embodiments, the safety system 12 and/or the controller 28 can be configured to sense or detect movement of at least a portion of the user 20 above a predetermined velocity generally toward the moving component 16 of the power tool 10, when such movement is at least is close proximity to the predetermined danger zone 34.

Further, the controller 28 can incorporate the use of any system of electrical connections, e.g., relays, General Purpose Input/Output (GPIO) connections, etc., for purposes of electrically connecting the controller 28 with the sensor assembly 26 and the braking system 30, as well as electrically connecting various components within the controller 28.

The general concept of sensing and/or identifying when the wearable component 24 and/or at least a portion of the hand 20A of the user 20 may be positioned within the danger zone 34 will now be described. In particular, utilizing an RGB input device as the first sensor 26A enables the controller 28 to receive as input the full color spectrum of the area near, adjacent to and/or substantially encircling the moving component 16 of the power tool 10. Conversely, the NoIR input device as the second sensor 26B contains a no infrared filter and produces a near gray scale image (with infrared backlighting) of the area near, adjacent to and/or substantially encircling the moving component 16 of the power tool 10. Thus, the infrared reflective material that is included on the wearable component 24 will appear black in the region 32A monitored by the first sensor 26 (e.g., the RGB camera frame) and bright white in the region 32B monitored by the second sensor 26B (e.g., the NoIR camera frame).

During use of the safety system 12, both sensors 26A, 26B are aligned to a central origin in front of the moving component 16 of the power tool 10 with their x and y axes being parallel, respectively. During initial pixel capture, the first region 32A monitored by the first sensor 26A and the second region 32B monitored by the second sensor 26B are substantially similar in size and shape and can intersect, overlap and/or coincide for a majority of the respective regions 32A, 32B. Subsequently, the images (pixels) captured by the first sensor 26A and the second sensor 26B within the first region 32A and the second region 32B, respectively, can be cropped and upsampled as necessary in order to equalize and align the coverage of each sensor 26A, 26B in pixel space, i.e. to provide a common region 32C (illustrated in FIG. 1C). In order to achieve the sensing of the infrared reflective material from the wearable component 24, the controller 28 can use the following algorithm:

```
sensing(IRCam, RGBCam){
        sensed = matrix to hold sensed data
    nR = number of rows for both matrices
    nC = number of columns for both matrices
    for r = 0 to nR{
        for c = 0 to nC
            if IRCam(r,c) is close to white and RGBCam  (r,c)
            is close to black
                if (RGBCam(r,c)[0] + [1] + [2]) –
                    (IRCam(r,c)[0] + [1] + [2])
is large ( > 500)
                    sensed(r,c) = white
                else sensed(r,c) = black
            else sensed(r,c) = black
        }
    }
}
```

For each pixel received by the first sensor 26A (i.e. the RGB camera), if the red, green or blue values exist outside of the black family of colors (in one non-exclusive representative embodiment, R, G or B values no higher than 60 for any individual value and with a variance no higher than 30 for an 8-bit color value [0-255]), then the pixels are ignored. This eliminates colors other than black that may have change high enough between the two sensors 26A, 26B to pass the delta test.

Somewhat similarly, for each pixel received by the second sensor 26B (i.e. the NoIR camera), if the red, green or blue values exist outside of the white family of colors (in one non-exclusive representative embodiment, R, G or B values no lower than 210 for any individual value and with a variance no higher than 40 for an 8-bit color value [0-255]), then the pixels are ignored. Again, this is done to lower false positives in the delta test.

Since some pixels may still be left with values that exist inside of the acceptable ranges for each sensor 26A, 26B that are not the intended material of the wearable component 24, a pixel-for-pixel comparison can be made seeking a high delta value. More particularly, the algorithm seeks to find what areas of the captured images (pixels) have changed from pure black to pure white between the first sensor 26A (e.g., the RGB camera) and the second sensor (e.g., the NoIR camera), while still accepting some color that may reflect off the material of the wearable component 24. At this point, the noted areas are now defined as containing the wearable component 24 that includes and/or has been coated in, for example, the infrared reflective material.

Subsequently, to determine if a collision has occurred, i.e. to see if the wearable component 24 has actually extended to within the danger zone 34, the following algorithm is utilized:

```
bool collision(sensed, OR, OC, rad ){//danger zone OriginRow OriginColumn rad(ius)
    nR = number of rows for matrix
    nC = number of columns for matrix
    for r = 0 to nR{
        for c = 0 to nC
            if sensed(r,c) is white
                if sqrt((r – OR)²+ (c – OC)²2) <= rad
                    return true
```

```
        }
    }
    return false
}
```

Upon determination that the wearable component 24 has indeed entered into the predetermined danger zone 34, then the controller 28 generates an appropriate signal to so indicate. Further, the controller 28 can then transmit the signal to the braking system 30 to activate the braking system 30.

The braking system 30 is configured to selectively and rapidly stop movement of the moving component 16 of the power tool 10 upon receipt of a proper signal from the controller 28. More particularly, with specific use of the safety system 12, the braking system 30 is configured to selectively and rapidly stop movement of the moving component 16 of the power tool 10 upon receipt of a signal from the controller 28 that the wearable component 24 is within the predetermined danger zone 34 while the power tool 10 is running.

The braking system 30 can have any suitable design. Additionally, the safety system 12 can be configured such that the braking system 30 is effectively activated, i.e. by an appropriate signal from the controller 28, and operated at any desired speed to inhibit injury to the user 20. For example, in one non-exclusive embodiment, the braking system 30 can be effectively activated and operated at a reaction time braking speed of approximately 1.2 meters per second. Such a reaction time braking speed should be sufficient to inhibit injury to the user 20 in almost all working situations. Alternatively, the braking system 30 can be configured to be activated and operated at another suitable reaction time braking speed.

In summary, as measured from an origin of the predetermined danger zone 34, if any pixel defined as representing the material of the wearable component 24 comes closer to the origin than the distance of a radius of the danger zone 34, then it is determined by the controller 28, i.e. through application of the algorithms noted above, that the wearable component 24 has entered the danger zone 34. A signal, e.g., a GPIO signal, is then generated and sent, thus actuating the braking system 30.

When the signal is transmitted to the braking system 30 so as to actuate the braking system 30, the safety system 12, i.e. the sensor assembly 26 and the controller 28, is said to be working in collision detection mode. Additionally, as noted above, the safety system 12, i.e. the sensor assembly 26 and the controller 28, can also be used in the glove-sensing mode (or component-sensing mode). Stated in another manner, utilizing the sensing algorithm used for collision detection, the safety system 12 also is able to sense the presence of the wearable component 24 of the user 20 prior to the power tool 10 being switched on. As such, the safety system 12 requires the presence of the wearable component 24 on the focal plane before the power tool 10 can be energized. The wearable component 24 is considered present when their collection of grouped and sensed pixels (in no more or less than two groups) equates to an area predefined as the two-dimensional surface area of the wearable component 24 (as viewed from above) with hands flat on the focal plane. A GPIO controlled relay that allows current to reach the on/off switch 18 is then energized for a predetermined amount of time, during which time the power tool 10 can be turned on. If the predetermined time elapses prior to the power tool 10 being turned on, then the relay is de-energized and the safety system 12 waits for the wearable component 24 to be re-presented. In certain embodiments, at the motor, an additional relay is in place that is actuated by the motor current. The additional relay acts for sensing of a running condition on the power tool 10. This additional relay allows the SBC of the controller 28 to seamlessly swap between the glove-sensing mode and the collision detection mode.

Thus, in certain embodiments, the power tool 10 is only startable, e.g., via the on/off switch 18, once the user 20 introduces the wearable component 24 within the region that is monitored and/or sensed by the sensor assembly 26. At such time, the controller 28 is considered to be in the "glove-sensing mode". Alternatively, in other embodiments, the power tool 10 can be started by the user 20 without the need to initially introduce the wearable component 24 within the region that is monitored and/or sensed by the sensor assembly 26.

Figure 1B:
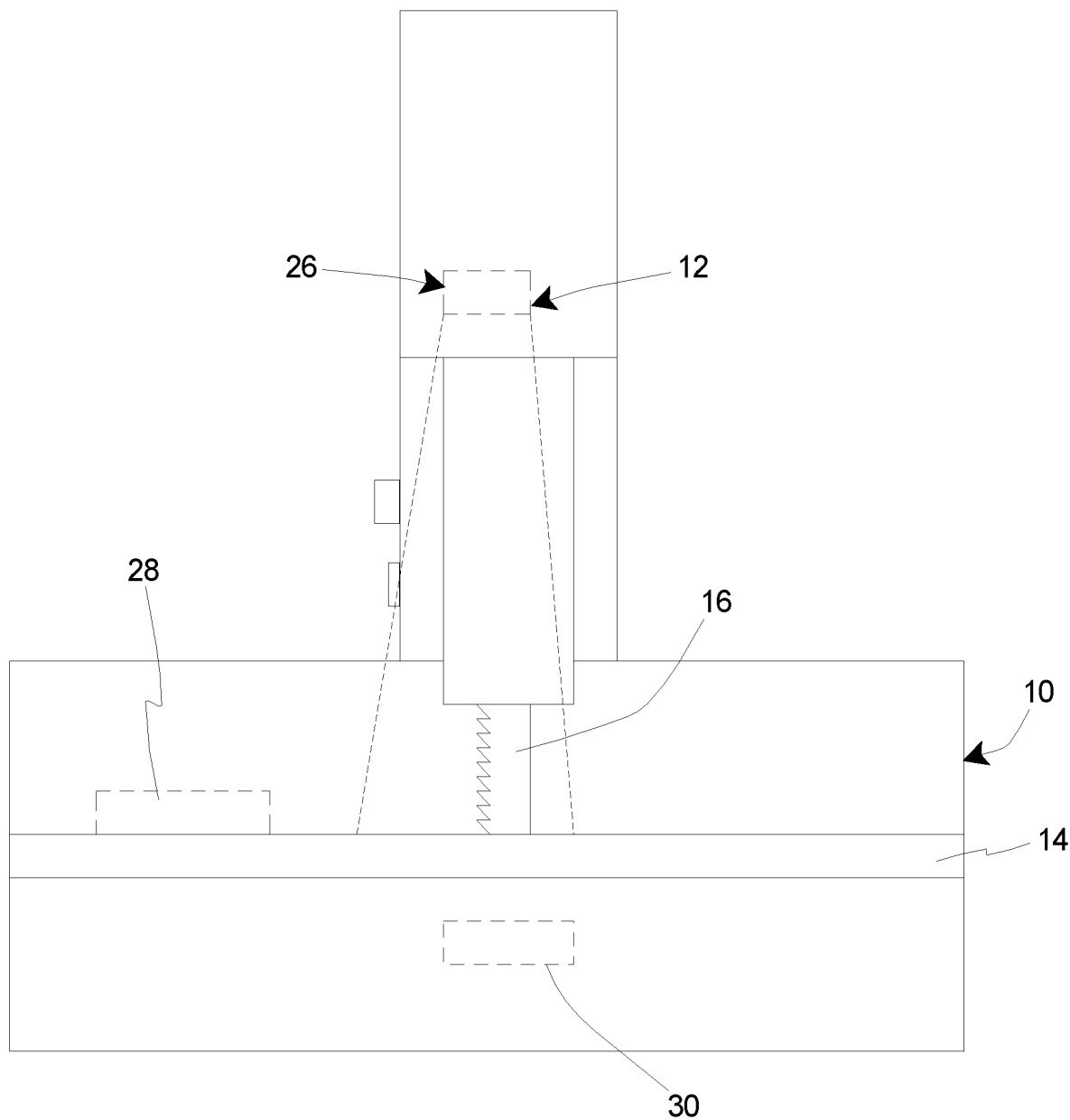
FIG. 1B is a simplified schematic side view illustration of the power tool, and the portion of the power tool safety system illustrated in FIG. 1A.

FIG. 1B is a simplified schematic side view illustration of the power tool 10, and the portion of the power tool safety system 12 illustrated in FIG. 1A. More specifically, FIG. 1B provides another view of the power tool 10 and the safety system 12 of the present invention, and the operational features and components thereof. For example, FIG. 1B again illustrates the base 14 and the moving component 16 of the power tool 10, and the sensor assembly 26 (illustrated in phantom), the controller 28 (illustrated in phantom) and the braking system 30 (illustrated in phantom) of the safety system 12.

Figure 1C:
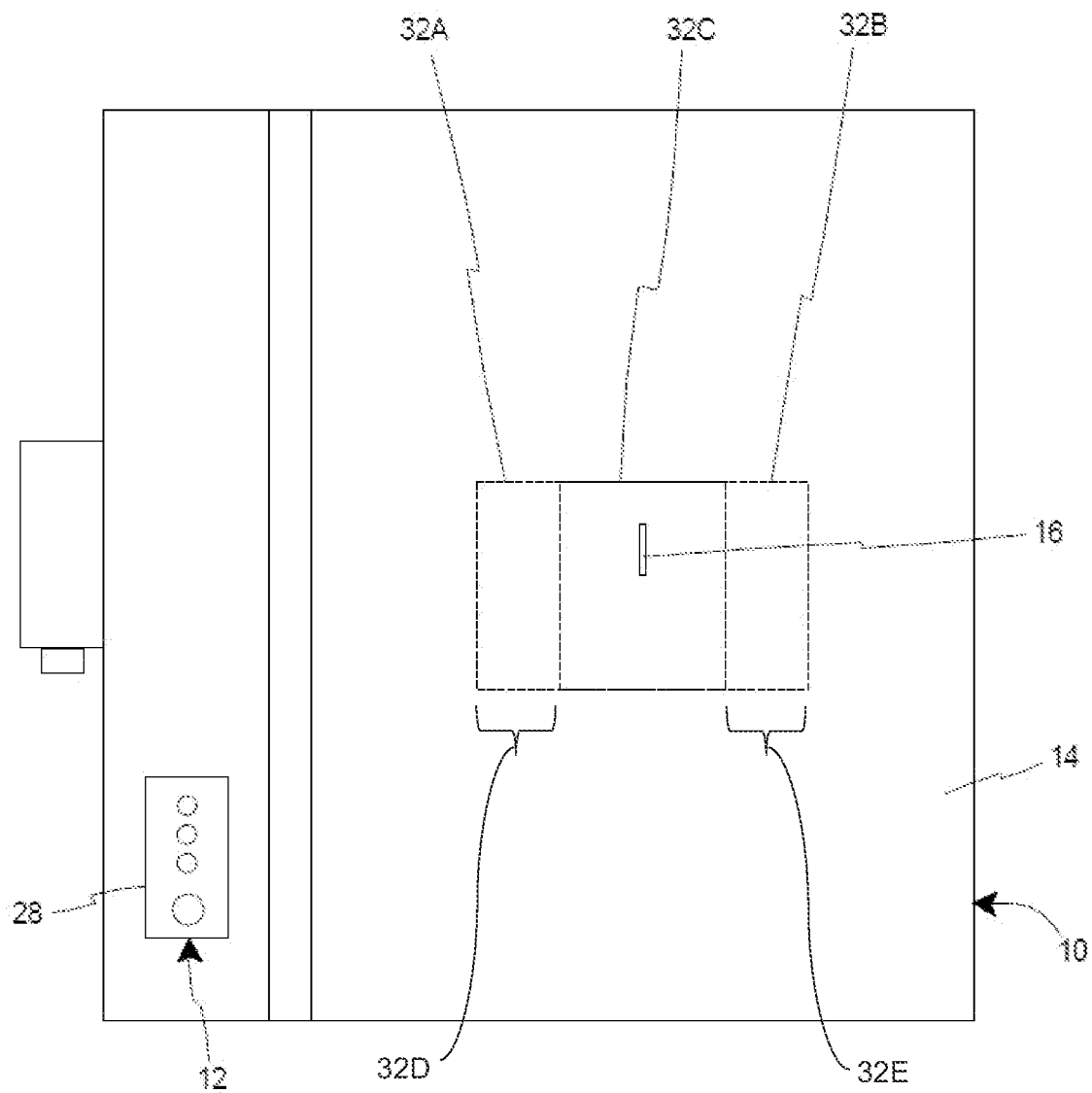
FIG. 1C is a simplified schematic top view illustration of a portion of the power tool and the power tool safety system illustrated in FIG. 1A.
Figure 1D:
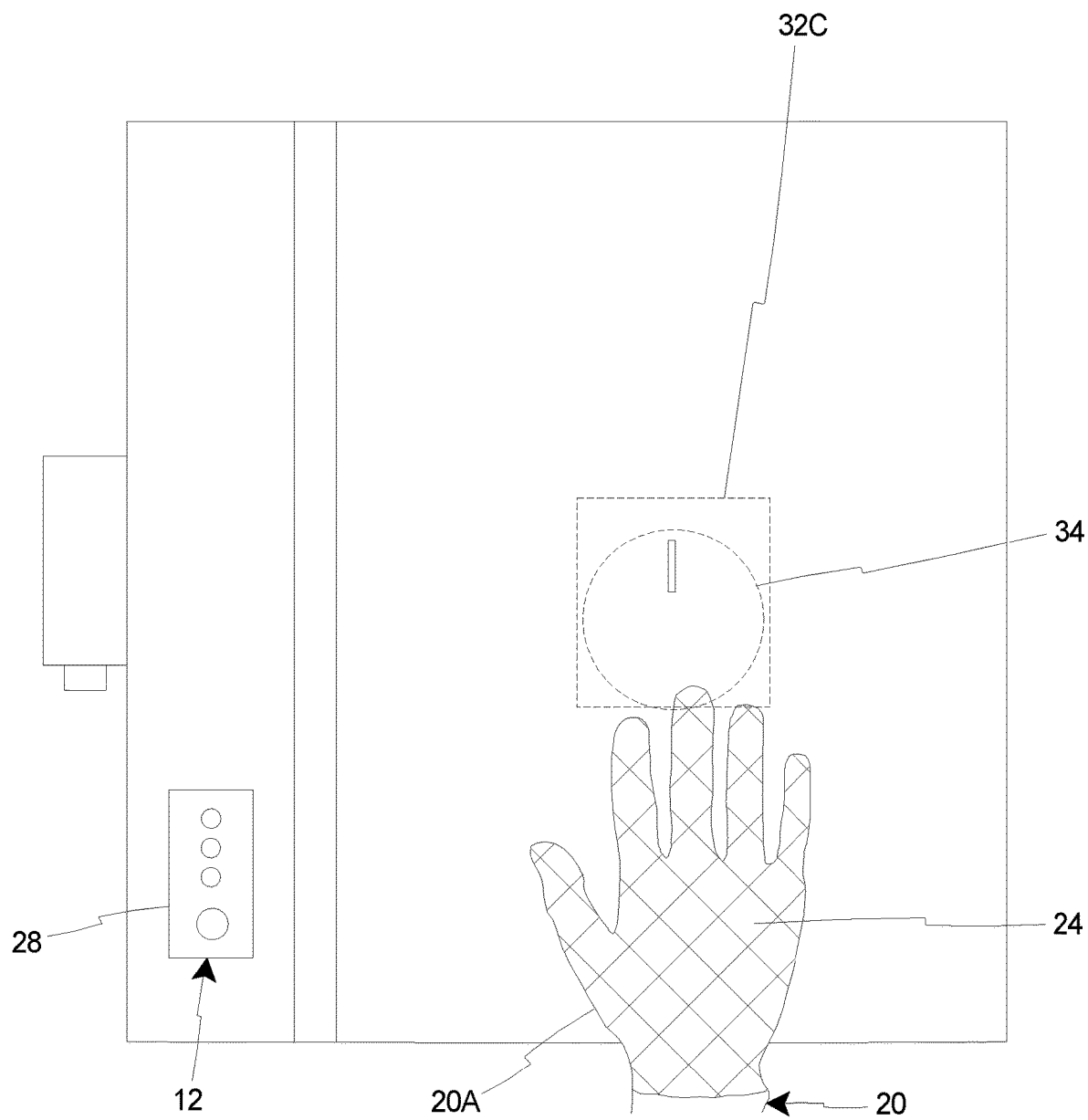
FIG. 1D is a simplified schematic top view illustration of a portion of a user, and a portion of the power tool and the power tool safety system illustrated in FIG. 1A.

FIGS. 1C and 1D more clearly illustrate the regions 32A, 32B that are captured by the first sensor 26A (illustrated in FIG. 1A) and the second sensor 26B (illustrated in FIG. 1A), respectively, and the determination of the danger zone 34 in the area near to, adjacent to, and/or that substantially encircles the moving component 16 of the power tool 10. In particular, FIG. 1C is a simplified schematic top view illustration of a portion of the power tool 10 and the power tool safety system 12 illustrated in FIG. 1A. It is appreciated that certain portions of the power tool 10 and certain portions of the safety system 12 have not been illustrated in FIG. 1C for purposes of clarity. Additionally, FIG. 1D is a simplified schematic top view illustration of a portion of the user 20, i.e. the hand of the user 20, and a portion of the power tool 10 and the power tool safety system 12 illustrated in FIG. 1A. It is again appreciated that certain portions of the power tool 10 and certain portions of the safety system 12 have not been illustrated in FIG. 1D for purposes of clarity.

As shown in FIG. 1C, the first sensor 26A is configured to monitor the first region 32A, e.g., to capture images (pixels) within the first region 32A, and the second sensor 26B is configured to monitor the second region 32B, e.g., to capture images (pixels) within the second region 32B. For simplicity, the first region 32A and the second region 32B are illustrated in FIG. 1C as being substantially rectangular in shape. However, it is appreciated that in certain alternative embodiments, the first region 32A and/or the second region 32B can be other than substantially rectangular-shaped. For example, in some non-exclusive alternative embodiments, one or both of the regions 32A, 32B can be substantially circle-shaped, oval-shaped, or some other shape.

Additionally, FIG. 1C further illustrates that the intersection and/or overlap between the first region 32A and the second region 32B, e.g., along the work surface on the base 14 of the power tool 10, defines a common region 32C that is further utilized for defining the predetermined danger zone 34 (illustrated in FIG. 1D) that is positioned near to, adjacent to, and/or substantially encircles the moving component 16 of the power tool 10. Stated in another manner, the predetermined danger zone 34 can be based on the common region 32C. FIG. 1C also illustrates that the first region 32A can have a first mutually exclusive region 32D and the second region 32B can have a second mutually exclusive region 32E, with each mutually exclusive region 32D, 32E being separate from (i) one another, and (ii) the common region 32C. More specifically, in one embodiment, as shown in FIG. 1D, the danger zone 34 can be defined and/or predetermined by extending a radius in all directions from an origin within the common region 32C. Alternatively, the danger zone 34 can be predetermined within the common region 32C in a somewhat different manner.

Further, as noted above, FIG. 1D also shows the user 20, i.e. the hand 20A of the user 20, with the wearable component 24 positioned thereon. As shown, the wearable component 24 has just extended within the predetermined danger zone 34, and thus should be readily detectable by the safety system 12, i.e. by the sensor assembly 26 and the controller 28.

Figure 2:
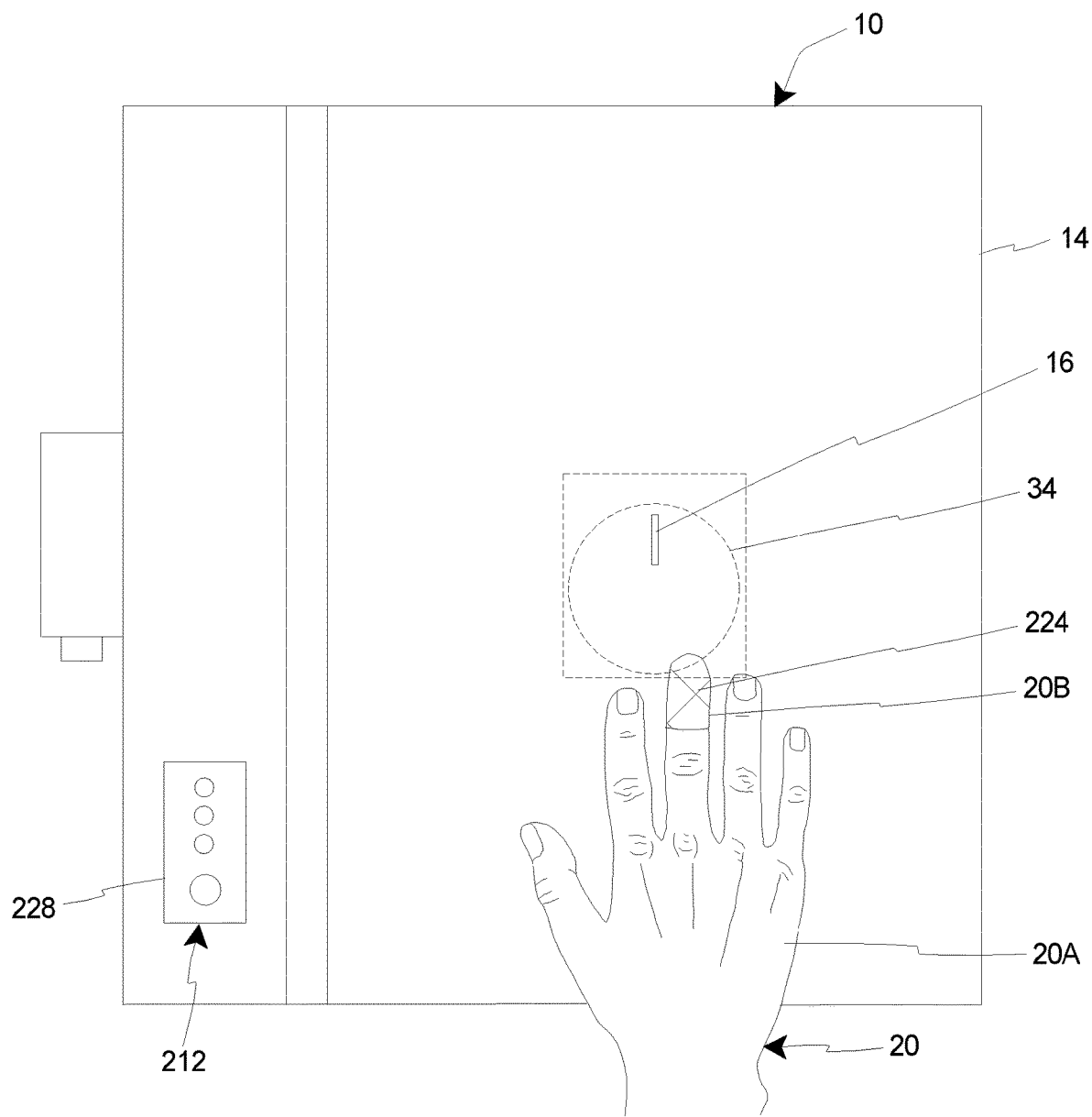
FIG. 2 is a simplified schematic top view illustration of a portion of the user, a portion of the power tool, and a portion of another embodiment of the power tool safety system.

FIG. 2 is a simplified schematic top view illustration of a portion of the user 20, i.e. the hand 20A of the user 20, a portion of the power tool 10, and a portion of another embodiment of the power tool safety system 212. It is appreciated that certain portions of the power tool 10 and certain portions of the safety system 212 have not been illustrated in FIG. 2 for purposes of clarity.

As shown in FIG. 2, the power tool 10 is again a band saw, although it is appreciated that the power tool 10 can be any suitable power tool that is usable with the safety system 212. More specifically, FIG. 2 again illustrates at least the base 14 and the moving component 16 of the power tool 10.

Additionally, the safety system 212 is substantially similar to the safety system 12 that was illustrated and described herein above. For example, the safety system again includes the sensor assembly (not shown in FIG. 2), the controller 228, and the braking system (not shown in FIG. 2) that are substantially similar in overall design and function to what was illustrated and described above. However, the wearable component 224 that is utilized in the embodiment shown in FIG. 2 is somewhat different in design as compared to the previous embodiment. In particular, in this embodiment, the wearable component 224 is configured to only cover one finger-tip 20B on the hand 20A of the user 20, rather than having a glove-like design that covers the entire hand 20A of the user 20. Further, the wearable component 224 is again made from and/or includes material that can be sensed by the sensors 26A, 26B (illustrated, for example, in FIG. 1A) of the sensor assembly for purposes of identifying when the wearable component 224 (and thus at least a portion of the hand 20A of the user 20) enters the danger zone 234 near, adjacent to and/or that substantially encircles the moving component 16 of the power tool 10 during use of the power tool 10.

Figure 3:
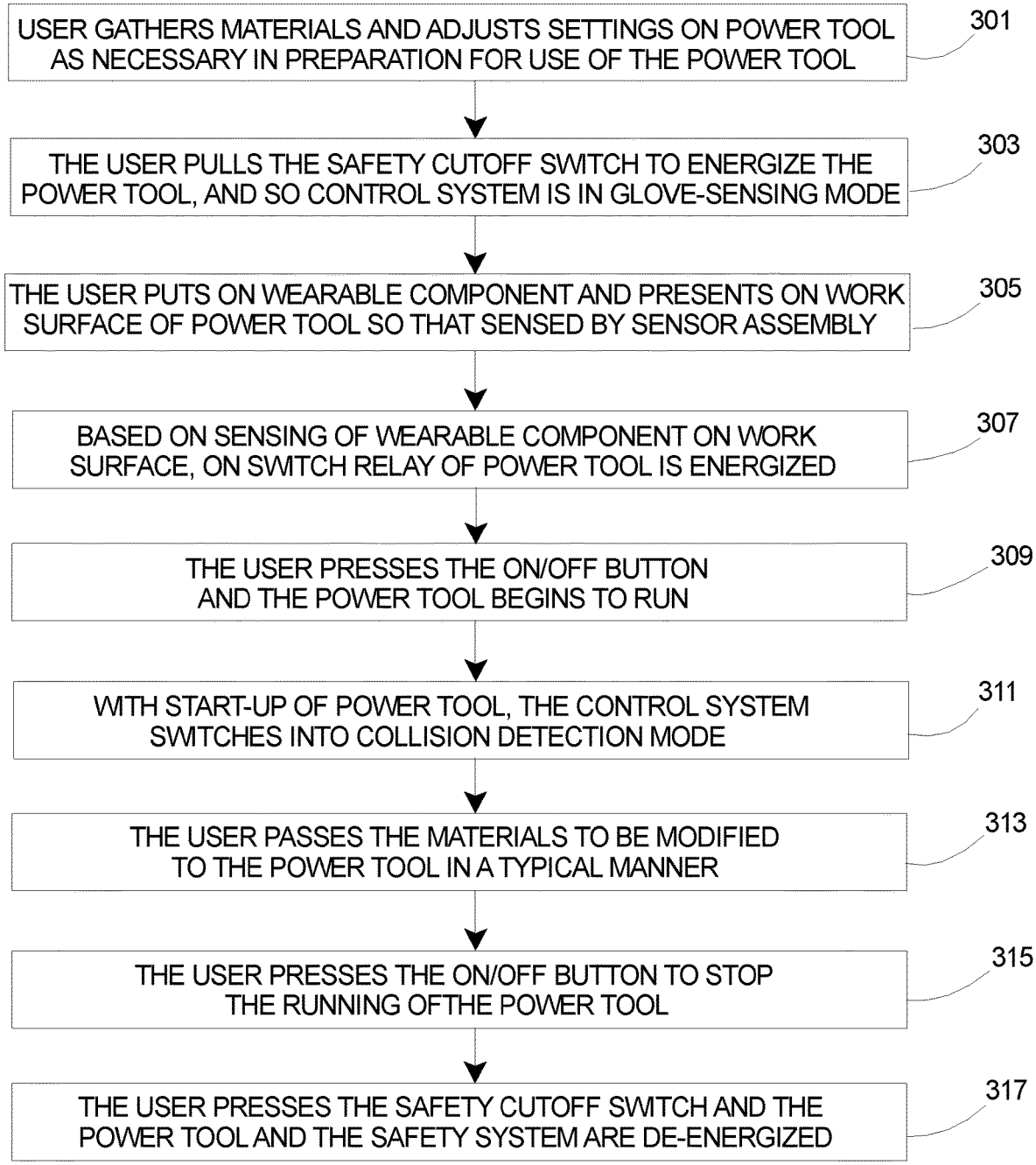
FIG. 3 is a flowchart illustrating a representative example of a use of the power tool in conjunction with the power tool safety system.
Figure 4:
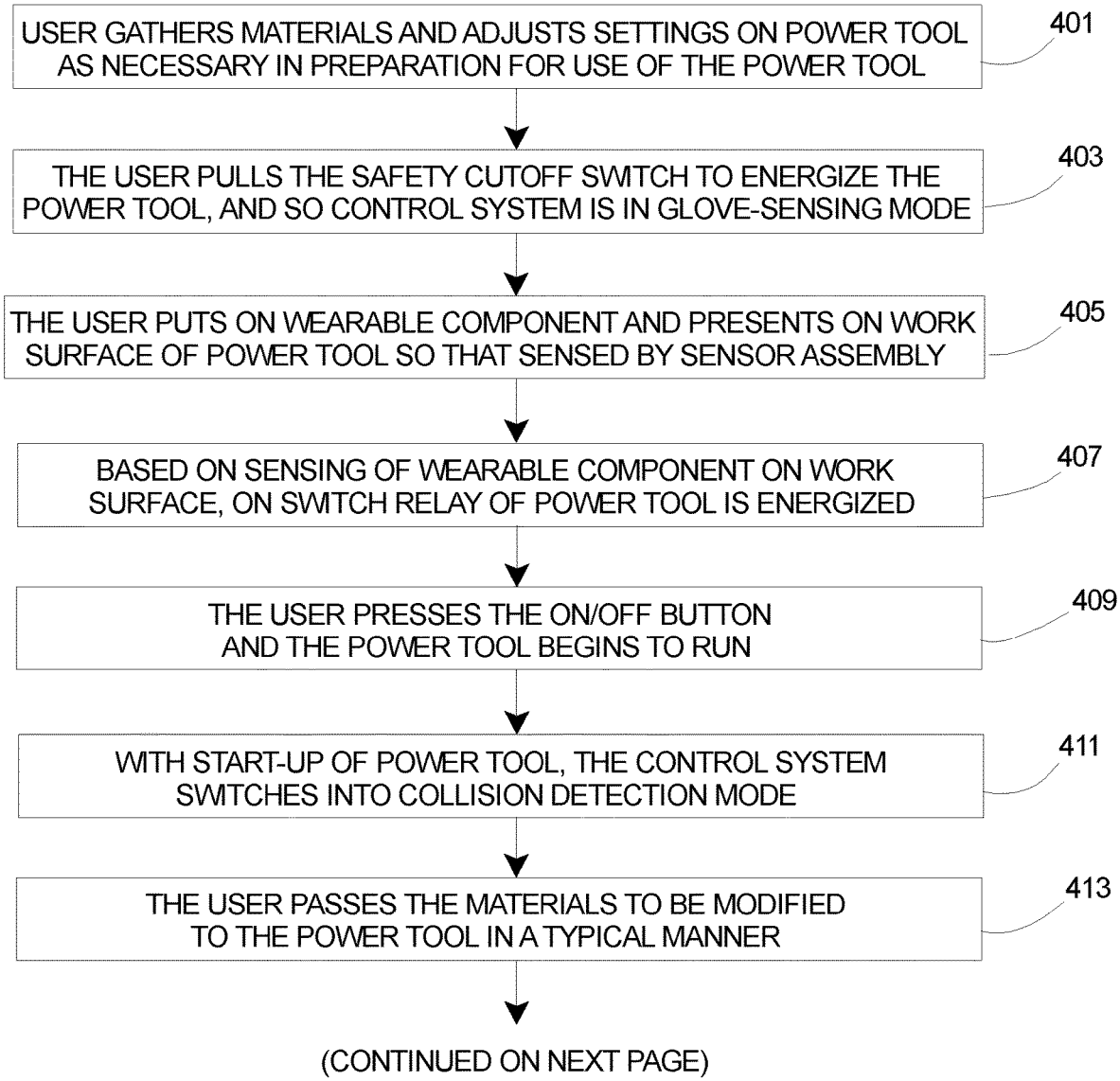
FIG. 4 is a flowchart illustrating another representative example of a use of the power tool in conjunction with the power tool safety system.
Figure 4:
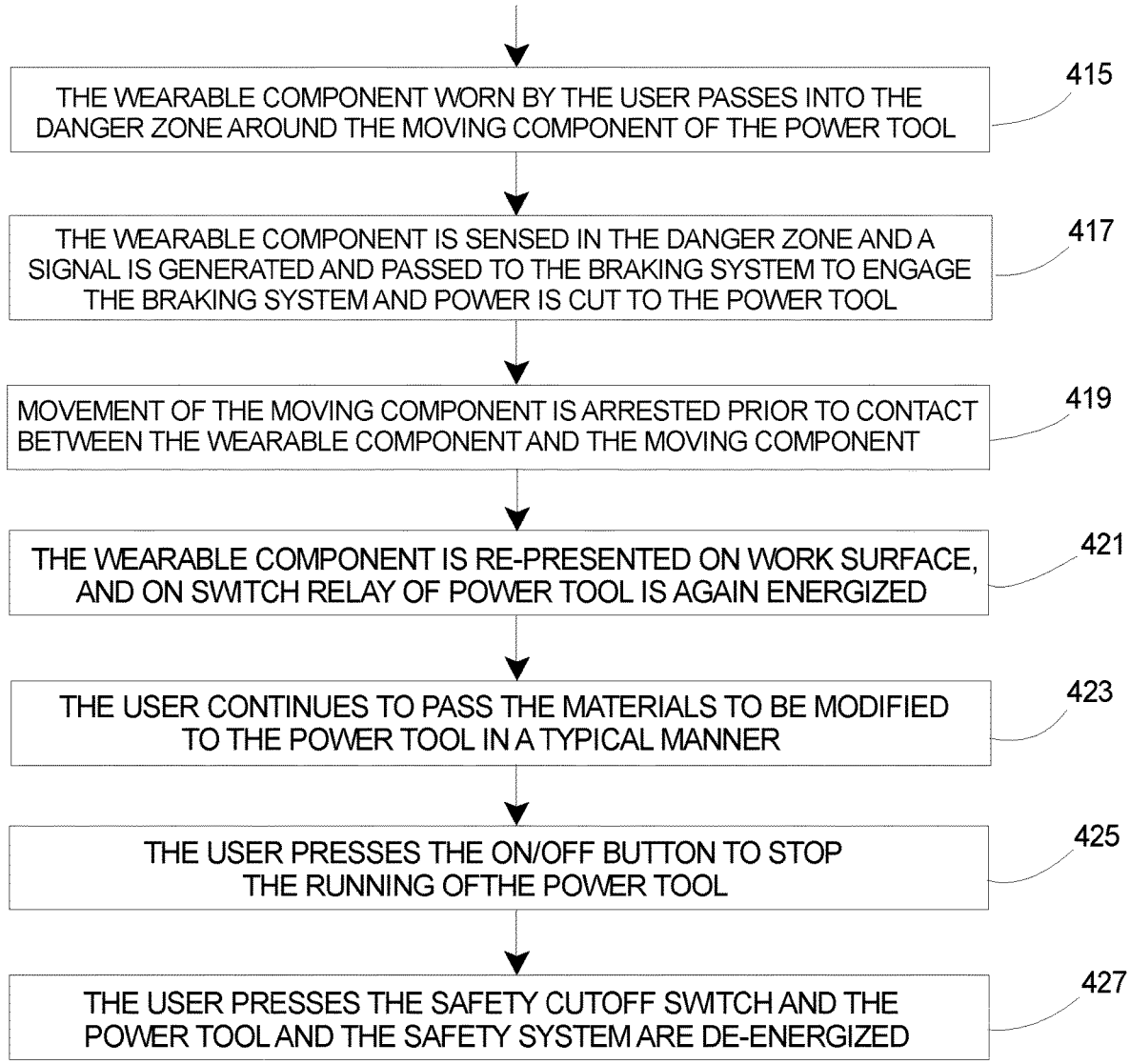

FIGS. 3 and 4 are flowcharts showing representative examples of use of the power tool in conjunction with the power tool safety system. It is understood that the representative examples disclosed herein can include greater or fewer steps than those shown and described relative to FIGS. 3 and 4. Stated another way, the representative examples described in accordance with the present invention can omit one or more steps illustrated in FIGS. 3 and 4, or can add additional steps not shown and described in FIGS. 3 and 4, and still fall within the purview of the present invention. Further, the sequence of the steps can be varied from those shown and described relative to FIGS. 3 and 4. Thus, it is appreciated that the specific sequence of steps illustrated in FIGS. 3 and 4 is not intended to limit the sequencing of steps in any manner.

Referring initially to FIG. 3, FIG. 3 is a flowchart illustrating a representative example of a use of the power tool in conjunction with the power tool safety system. In particular, FIG. 3 illustrates an example of a use of the power tool where the sensor assembly and/or the controller does not sense the presence of the wearable component within the danger zone that surrounds the moving component of the power tool.

At step 301, a user gathers materials to be used during use of the power tool, e.g., the materials to be modified, such as pieces of wood to be cut, during use of the power tool, and makes adjustments to the settings of the power tool as necessary for typical and/or desired use of the power tool.

At step 303, the user pulls the safety cutoff switch on the power tool, thereby energizing the power tool and the controller. At such time, in certain embodiments, the controller, i.e. the single board computer (SBC), enters into a glove-sensing mode.

At step 305, the user puts on the wearable component, e.g., the glove, and then presents the wearable component on the work surface of the power tool such that the wearable component is sensed by the sensor assembly.

At step 307, based on the sensing of the wearable component on the work surface, the on switch relay for the power tool is energized.

At step 309, the user presses the on/off (start) button and the power tool begins to run.

At step 311, with the start-up of the power tool, the controller, i.e. the SBC, changes into collision detection mode (at run time).

At step 313, the user then passes the materials to be modified, e.g., the pieces of wood to be cut, to the power tool in a typical manner.

At step 315, the user presses the on/off (stop) button on the power tool to stop the running of the power tool. At this point, the power tool allows the user to turn the power tool back on for a predetermined period of time (at which point the controller, i.e. the SBC, would return to the glove-sensing mode). However, it is also appreciated that upon pressing of the on/off button, the collision detection mode may continue to run for a specified period of time to account for machine slow down and stop time.

At step 317, the user presses the safety cutoff switch and the power tool and the safety system are de-energized.

FIG. 4 is a flowchart illustrating another representative example of a use of the power tool that is used in conjunction with the power tool safety system. In particular, FIG. 4 illustrates an example of a use of the power tool where the sensor assembly and/or the controller does sense the presence of the wearable component within the danger zone that surrounds the moving component of the power tool.

At step 401, a user gathers materials to be used during use of the power tool, e.g., the materials to be modified, such as pieces of wood to be cut, during use of the power tool, and makes adjustments to the settings of the power tool as necessary for typical and/or desired use of the power tool.

At step 403, the user pulls the safety cutoff switch on the power tool, thereby energizing the power tool and the controller. At such time, in certain embodiments, the controller, i.e. the single board computer (SBC), enters into a glove-sensing mode.

At step 405, the user puts on the wearable component, e.g., the glove, and then presents the wearable component on the work surface of the power tool such that the wearable component is sensed by the sensor assembly.

At step 407, based on the sensing of the wearable component on the work surface, the on switch relay for the power tool is energized.

At step 409, the user presses the on/off (start) button and the power tool begins to run.

At step 411, with the start-up of the power tool, the controller, i.e. the SBC, changes into collision detection mode (at run time).

At step 413, the user then passes the materials to be modified, e.g., the pieces of wood to be cut, to the power tool in a typical manner.

At step 415, while the user is passing the materials to be modified to the power tool, the wearable component that is being worn by the user passes into the danger zone surrounding the moving component of the power tool.

At step 417, the sensor assembly and the controller sense the presence of the wearable component in the danger zone surrounding the moving component of the power tool, and a signal is generated and transmitted to the braking system such that the braking system is engaged to rapidly stop movement of the moving component relative to the base of the power tool, and power to the motor of the power tool is cut.

At step 419, the movement of the moving component relative to the base of the power tool is arrested prior to contact between the wearable component and the moving component.

At step 421, the user re-presents the wearable component on the work surface of the power tool such that the wearable component is sensed by the sensor assembly, and the on switch relay for the power tool is again energized.

At step 423, the user continues to pass the materials to be modified, e.g., the pieces of wood to be cut, to the power tool in a typical manner.

At step 425, the user presses the on/off (stop) button on the power tool to stop the running of the power tool. At this point, the power tool allows the user to turn the power tool back on for a predetermined period of time (at which point the controller, i.e. the SBC, would return to the glove-sensing mode). However, it is also appreciated that upon pressing of the on/off button, the collision detection mode may continue to run for a specified period of time to account for machine slow down and stop time.

At step 427, the user presses the safety cutoff switch and the power tool and the safety system are de-energized.

In summary, the safety system 12 of the present invention, as described in detail herein, is designed to arrest the motion of a moving component 16 on a power tool 10, e.g., a blade on a cutting tool, prior to contact with the user 20. For example, in various embodiments, utilizing a single board computer (SBC) and a red green blue (RGB) input device and no infrared filter (NoIR) input device pair, the motion of a wearable component 24 coated in black infrared only reflective material can be sensed within a predetermined danger zone 34 near, adjacent to and/or substantially encircling the moving component 16. Upon sensing the infrared reflective material of the wearable component 24 having entered into the danger zone 34, a GPIO signal is sent to a relay that actuates a push/pull solenoid; thus engaging a mechanical braking system 30 to rapidly stop movement of the moving component 16.

Additionally, as provided herein, the safety system 12 of the present invention provides various unique features applicable during operation of the power tool 10 with which the safety system 12 is being used. For example, in certain embodiments, the safety system 12 provides features such as (i) utilizing a camera array, biased by infrared filtering, to detect an infrared only reflective material or pigment; (ii) utilizing the large change in color (as opposed to the existence of color) at a moment in time to distinguish the item of interest, e.g., the wearable component 24 and/or at least a portion of the hand 20A of the user 20; (iii) utilizing a synchronized camera array to detect presence of the user 20, e.g., via the wearable component 24, within a danger zone 34, and thus signaling for activation of the braking system 30 to stop movement of the moving component 16 of the power tool 10; (iv) utilizing an infrared only reflective pigment coated wearable component 24 to identify the presence in the user 20 in the work area and the danger zone 34 around the moving component 16; and (v) forcing the user 20 to present the wearable component 24 on the work surface of the power tool 10 as proof of presence of the user 20 or wearable component 24 before the power tool 10 can be switched to the operating (running) condition.

Figure 5A:
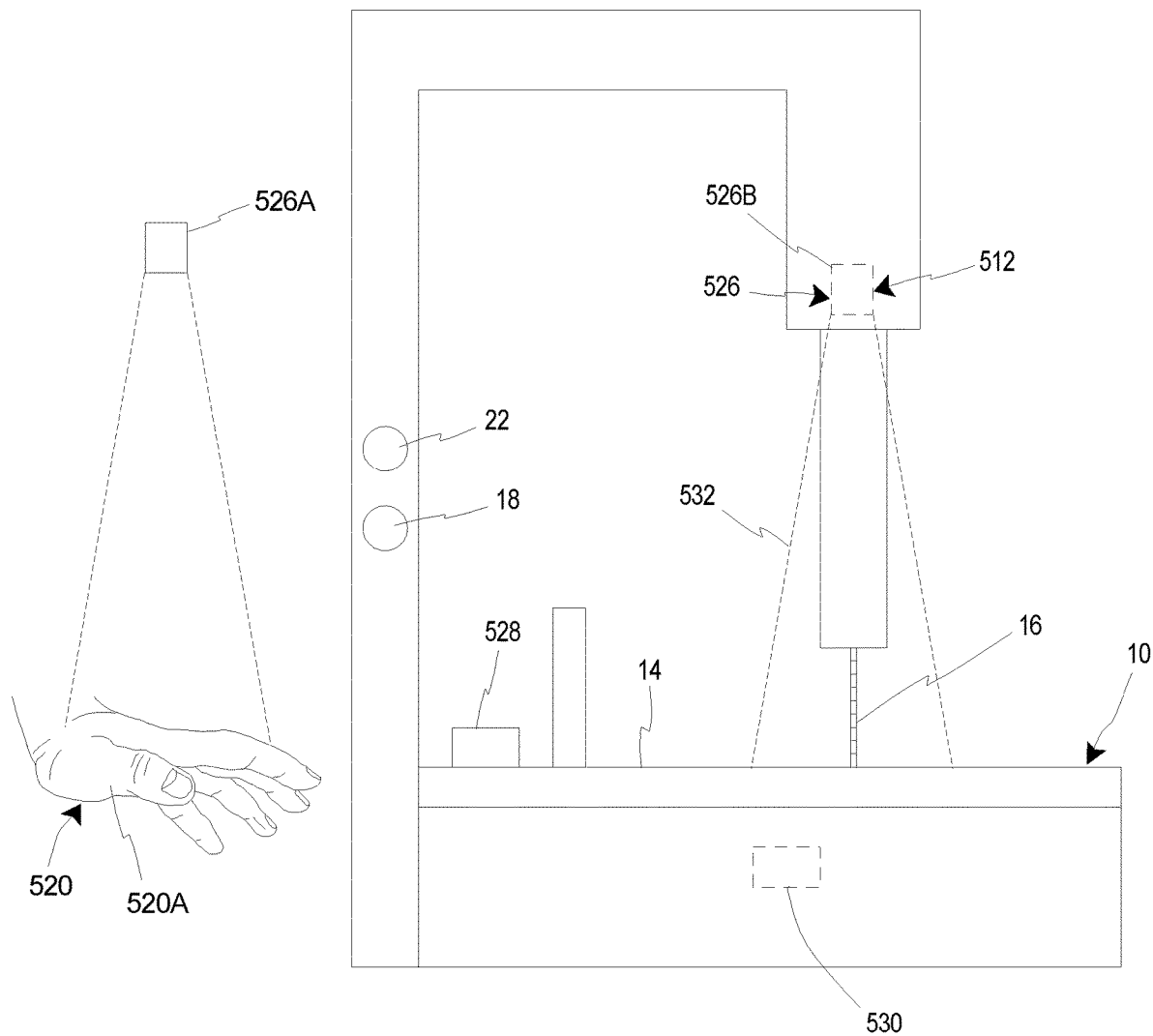
FIG. 5A is a simplified schematic front view illustration of the power tool, and a portion of still another embodiment of the power tool safety system.
Figure 5B:
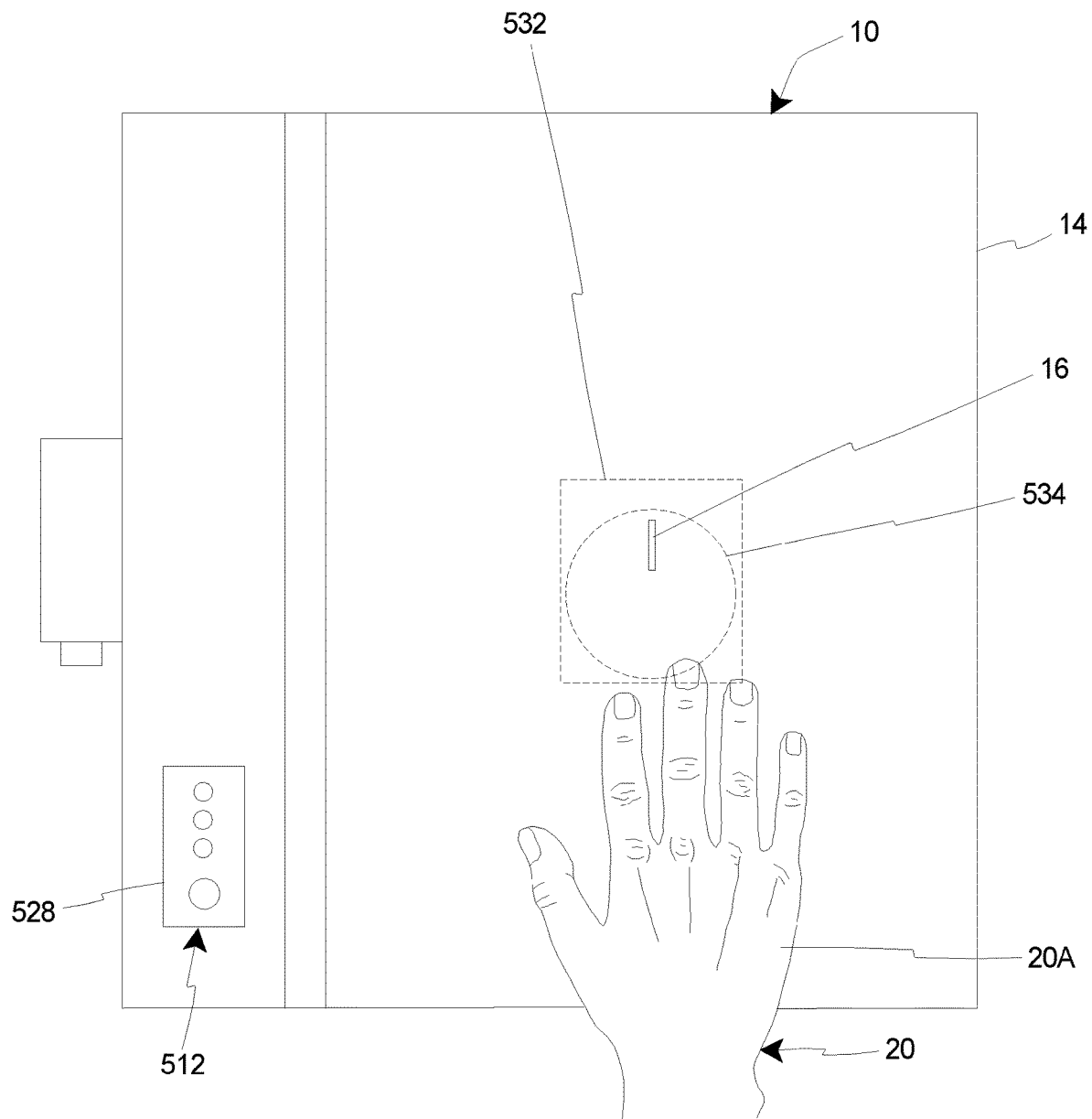
FIG. 5B is a simplified schematic top view illustration of a portion of the user, a portion of the power tool, and a portion of the power tool safety system illustrated in FIG. 5A.

Further, as noted above, in certain embodiments of the present invention, the safety system need not include the wearable component. For example, FIG. 5A is a simplified schematic front view illustration of the power tool 10, and a portion of still another embodiment of the power tool safety system 512. Additionally, FIG. 5B is a simplified schematic top view illustration of a portion of the user 20, i.e. a hand 20A of the user 20, a portion of the power tool 10, and a portion of the power tool safety system 512 illustrated in FIG. 5A. It is appreciated that certain portions of the power tool 10 and certain portions of the safety system 512 have not been illustrated in FIG. 5A and/or FIG. 5B for purposes of clarity.

As above, the power tool 10 can again be a band saw, a table saw, a circular saw, a miter saw, a drill press, or any other suitable power tool. Additionally, as with the previous embodiments, the power tool 10 includes the base 14 and the moving component 16, e.g., a saw blade or a drill bit, that is movable relative to the base 14. Further, the power tool 10 can also include an on/off (power) switch 18 and a safety cutoff switch 22 that are substantially identical in design and function as described in greater detail herein above.

Additionally, as illustrated in FIGS. 5A and 5B, the safety system 512 is somewhat similar to the previous embodiments, but does not include the wearable component that was included within the previous embodiments. More specifically, as illustrated in this embodiment, the safety system 512 can be configured to include one or more of a sensor assembly 526, a controller 528 and a braking system 530.

Referring initially to FIG. 5A, as with the previous embodiments, the sensor assembly 526 is configured to sense and/or detect the presence of at least a portion of a hand 20A of the user 20 in a position near and/or adjacent to the moving component 16 of the power tool 10. The design of the sensor assembly 526 can be varied to suit the requirements of the safety system 512. In this embodiment, as shown in FIG. 5A, the sensor assembly 526 includes a first sensor 526A and a second sensor 526B. Alternatively, in other embodiments, the sensor assembly 526 can include only a single sensor, or the sensor assembly 526 can be configured to use greater than two sensors.

During use of the safety system 512, the first sensor 526A is configured to function as a training sensor that is utilized to capture at least one hand image, and preferably a plurality of hand images (pixels). More particularly, as provided herein, the hand images as captured by the first sensor 526A are subsequently used for training purposes, i.e. to build a model of the hand and/or to train the controller 528 to recognize the presence of a hand 20A within a particular region. It is appreciated that the model of the hand can also be referred to as and/or function as at least a portion of a detection algorithm that is usable within the controller 528 Alternatively, it is appreciated that in certain embodiments, the safety system 512 and/or the sensor assembly 526 need not include the first sensor 526A, and suitable hand images gathered from any suitable source may be provided to the controller 528, i.e. to build a model of the hand 20A (a detection algorithm) and/or to train the controller 528 to recognize the presence of a hand 20A within a particular region.

In some embodiments, as shown in FIG. 5A, the first sensor 526A can be positioned spaced apart from the power tool 10 and can function independently of the power tool 10 when being used to capture hand images to build the virtual model of the hand and/or to generate the desired detection algorithm. Alternatively, in other embodiments, the first sensor 526A can be coupled to the power tool 10.

During capture of the hand images, e.g., with the first sensor 526A, it is desired to capture as many hand images as deemed necessary to effectively represent a broad spectrum of potential hand positions, shapes, colors and sizes. For example, in various applications, it can be desired to capture sufficient hand images to be able to effectively identify key points on hands such as joint locations, fingertips, palm markers, and/or other identifiable key points. With the effective capture of sufficient hand images to identify such key points on the hand, a model of the hand (detection algorithm) can be effectively built which is subsequently usable to identify the presence of a hand within a particular region, i.e. based on comparison of images captured within the region with the hand images used to build the model and/or the model of the hand (detection algorithm) itself. Additionally, it is appreciated that such key points on the hands can be predicted and retrained as necessary to increase the accuracy of the model (detection algorithm). Once the model has been effectively built, the model (detection algorithm) can be loaded into the controller 528 for use during hand detection applications associated with use of the safety system 512 while the power tool 10 is in use. More particularly, as described in greater detail herein below, during run time of the power tool 10, the controller 528 can utilize the uploaded model (detection algorithm) to predict if and where key points of a hand 20A are present within a predetermined danger zone 534 (illustrated in FIG. 5B). Stated in another manner, if key points of a hand 20A are found in images within a region, e.g., within a region 532 (illustrated in FIG. 5B) of the second sensor 526B, they are analyzed with the controller 528 in collision detection mode to determine if the key points, or significant areas between them, have entered into the predetermined danger zone 534.

In certain applications, the hand(s) utilized for capturing hand images with the first sensor 526A for building the model can be a representative hand 520A of a representative user 520 of the power tool 10, and/or the hand can be the hand of one or more other suitable persons. Additionally, in various applications, it is desired to utilize hand images of hands of various shapes, sizes and colors, so that the model (detection algorithm) is usable to effectively detect the presence of a hand 20A of any user 20 of the power tool 10. Alternatively, in other applications, it is appreciated that any suitable hand images can be utilized.

In summary, in certain embodiments, the first sensor 526A can be configured to operate within a neural network that is trained with a significant number of hand images representing a broad spectrum of hand positions, shapes, colors and sizes. With such design, the first sensor 526A can be utilized capture various hand images that are sufficient to build a comprehensive model of the hand, i.e. a comprehensive detection algorithm.

As shown, in various embodiments, the second sensor 526B can be coupled to the power tool 10 and can be positioned and oriented to monitor a region 532 near, adjacent to and/or that substantially encircles the moving component 16 of the power tool 10. For simplicity, the region 532 is illustrated in FIG. 5B as being substantially rectangular in shape. However, it is appreciated that in certain alternative embodiments, the region 532 can be other than substantially rectangular-shaped. For example, in some non-exclusive alternative embodiments, the region 532 can be substantially circle-shaped, oval-shaped, or some other shape.

Additionally, as above, the region 532 can then be utilized for defining the predetermined danger zone 534 that is positioned near to, adjacent to, and/or substantially encircles the moving component 16 of the power tool 10. Stated in another manner, the predetermined danger zone 534 can be based on the region 532. More specifically, in one embodiment, the danger zone 534 can be defined and/or predetermined by extending a radius in all directions from an origin within the region 532. Alternatively, the danger zone 534 can be predetermined within the region 532 in a somewhat different manner. However defined, the predetermined danger zone 534 is then utilized for purposes of determining if and when at least a portion of the hand 20A of the user 20 has entered into the danger zone 534. As such, the safety system 512, i.e. the sensor assembly 526 and/or the controller 528, can be said to be configured to monitor the predetermined danger zone 534 that is positioned near to, adjacent to, and/or substantially encircles the moving component 16 of the power tool 10.

It is appreciated that in certain embodiments, the second sensor 526B can also be used and/or function as the training sensor that captures the initial hand images that are used for building the model of the hand. As such, some embodiments can be designed without the specific need for the first sensor 526A as described herein, and the sensor assembly 526 may only include a single sensor, i.e. the second sensor 526B. Thus, in such embodiments, the second sensor 526B may be described as and/or can function as both the first sensor and the second sensor.

The design of the first sensor 526A and the second sensor 526B can be varied. For example, in certain embodiments, each of the first sensor 526A and the second sensor 526B can be a red blue green (RBG) input device, e.g., camera or other suitable input device, such as described above. More specifically, in such embodiments, the first sensor 526A can be a red blue green (RBG) input device that is used to capture various hand images for building a virtual model of the hand; and the second sensor 526B can be a red blue green (RBG) input device that is used to monitor the region 532 that is positioned near to, adjacent to, and/or substantially encircles the moving component 16 of the power tool 10. Alternatively, one or both of the first sensor 526A and the second sensor 526B can have another suitable design.

As above, the use of the terms "first sensor" and "second sensor" is merely for convenience and ease of illustration, and either sensor 526A, 526B can be referred to as the "first sensor" and/or the "second sensor".

In certain embodiments, the controller 528 can be coupled to the power tool 10, i.e. to the base 14 of the power tool 10. Alternatively, the controller 528 can be provided remotely from the power tool 10.

In the embodiment illustrated in FIGS. 5A and 5B, the controller 528 is configured to receive and analyze input (data) from the sensor assembly 526, i.e. the hand images (pixels) captured by the first sensor 526A that are used to build the virtual model of the hand, and the data generated by (e.g., images captured by) the second sensor 526B to determine when at least a portion of the hand 20A is within the predetermined danger zone 534 that is defined near to, adjacent to, and/or substantially encircling the moving component 16 of the power tool 10. Stated in another manner, the hand images, i.e. as captured by the first sensor 526A or otherwise provided to the controller 528, are utilized to generate a model of the hand including at least one key point, and preferably a plurality of key points of the hand. Such model is then usable by the controller 528 to determine whether a hand 20A of a user 20 has entered into the predetermined danger zone 534, e.g., by analyzing images of the region 532 as captured by the second sensor 526B.

As above, the controller 528 and the circuitry provided therewith can have any suitable design. For example, in some embodiments, the controller 528 includes a single board computer (SBC) having one or more processors or circuits for purposes of analyzing the data generated by (e.g., images captured by) the first sensor 526A and/or the second sensor 526B.

Additionally, in certain embodiments, the controller 528 can incorporate one more visual outputs, e.g., LED lights, that alert the user 20 regarding the status of the power tool 10 and/or the safety system 512. For example, in such embodiments, the controller 528 can include visual outputs indicative that the power tool 10 is in a no start (non-operating) condition, a can start condition, and a running (operating) condition; as well as a visual output regarding activation of the safety system 512, i.e. identifying a collision detection when at least a portion of the hand 20A is determined to be within the danger zone 534.

Further, the controller 528 can incorporate the use of any system of electrical connections, e.g., relays, General Purpose Input/Output (GPIO) connections, etc., for purposes of electrically connecting the controller 528 with the sensor assembly 526 and the braking system 530, as well as electrically connecting various components within the controller 528.

Further, as noted above, FIG. 5B also shows the user 20, i.e. the hand 20A of the user 20, having just extended within the predetermined danger zone 534. Thus, the hand 20A of the user 20 should be readily detectable by the safety system 512, i.e. by the sensor assembly 526 and the controller 528.

As above, if a collision to the danger zone 534 is detected, i.e. if at least a portion of the hand 20A is detected within the danger zone 534, a signal is sent from the controller 528 to engage the braking system 530 to rapidly arrest the motion of the moving component 16 of the power tool 10. Conversely, if a collision to the danger zone 534 is not detected, i.e. if at least a portion of the hand 20A is not detected within the danger zone 534, the power tool 10 and the safety system 512 continue normal operation without generating a signal to activate the braking system 530.

During use of the power tool 10 with such safety system 512 as illustrated and described herein, the following steps can occur: (i) the user 20 turns on the controller 528, i.e. the SBC, by pulling the safety cutoff switch 22 on the power tool; (ii) the controller 528 loads (with the model of the hand 20A as generated) and begins to search for hands within the region 532 of the second sensor 526B that is mounted above the work surface, i.e. the base 14 of the power tool 10; (iii) the user 20 turns the power tool 10 on (e.g., selectively activates the blade of the band saw); (iv) active collision detection begins; (v) the user 20 presents materials to the work surface, e.g., wood to be cut with the moving component 16, or blade, of the band saw 10; (vi) the hand 20A of the user 20 may enter the work surface at any point in the above process, and if the hand 20A of the user 20 enters the danger zone 534, the controller 528 generates a signal that is sent to the braking system 530 to shut down or arrest the motion of the power tool 10, but if the hand 20A of the user 20 remains outside of the danger zone 534 (i.e. is not detected within the danger zone 534), operation of the power tool 10 continues as normal; (vii) the user 20 then shuts off the power tool 10 (as above, it is appreciated that collision detection may continue to run for a specified period of time to account for slow down and stop time of the power tool 10); and (viii) the user 20 shuts off the safety cutoff switch 22, and in turn the controller 528 and collision detection are turned off.

In summary, in the embodiment shown in FIGS. 5A and 5B, the safety system 512 includes a neural network that is trained with a significant number of hand images representing a broad spectrum of hand positions, shapes, colors and sizes in order to generate a virtual model of the hand (i.e. a detection algorithm) that is utilized to determine at least one, and preferably multiple key points on the hand 20A. The hand model is then rendered in the region 532 of the second sensor 526B and utilized in a collision detection mode to determine if a hand 20A has entered into the predetermined danger zone 534.

It is appreciated that for proper use of this embodiment of the safety system 512, certain factors must be complied with: (i) Training of the detection system must occur prior to run time. In other words, the unit is fully trained and retrained prior to installation onto the controller 528 (SBC); (ii) Once on the controller 528 (SBC), the detection model should not change by retraining as this may lead to a drop in accuracy. In other words, the unit never retrains only on the specific hands of a user; (iii) During initial training of the model, key points may be found in error of actual key point locations. These key points can be manually corrected and the prediction model rerun until a significantly accurate detection platform is achieved; and (iv) As provided herein, in this embodiment, a glove or other wearable component is not required to train or detect a hand; however it may be used to reduce the amount of training that the system requires. For example, if a gloved hand is the sole method of training, the glove will then be required for detection. It is appreciated that this decision, i.e. whether the unit is to be trained on a gloved hand or a non-gloved hand, will have to be made prior to beginning programming of the unit.

It is understood that although a number of different embodiments of the power tool safety system have been illustrated and described herein, one or more features of any one embodiment can be combined with one or more features of one or more of the other embodiments, provided that such combination satisfies the intent of the present invention.

While a number of exemplary aspects and embodiments of the power tool safety system have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A safety system for use with a power tool that is usable by a user, the power tool including (i) a base having a work surface, and (ii) a moving component that is movable relative to the base, the safety system comprising:

a sensor assembly including a first sensor and a second sensor, the first sensor monitoring a first region that is adjacent to the moving component of the power tool, and the second sensor monitoring a second region that is adjacent to the moving component of the power tool, the first region intersecting the second region to define a common region along the work surface of the base, each of the first region and the second region including a corresponding first mutually exclusive region and a second mutually exclusive region that are separate (i) from one another, and (ii) from the common region.

2. The safety system of claim 1 further comprising a controller that utilizes a model of a hand that is based at least in part on a plurality of hand images that are captured by the first sensor while the power tool is in a non-operating condition, the model of the hand being usable only while the power tool is in the non-operating condition.

3. The safety system of claim 2 wherein the controller includes a single board computer having one or more processors.

4. The safety system of claim 2 further comprising a wearable component that is configured to be coupled to the hand of the user, the wearable component including black infrared only reflective material.

5. The safety system of claim 4 wherein the first sensor generates first data relating to the first region and the common region, and the second sensor generates second data relating to the second region and the common region, the controller being configured to compare the first data from the first sensor and the second data from the second sensor to determine whether the wearable component is present within the common region, the controller analyzing the data from the sensor assembly to determine whether the wearable component is present within the common region.

6. The safety system of claim 5 further comprising a braking system that is configured to selectively stop movement of the moving component of the power tool relative to the base when the controller determines that the wearable component is present within the common region.

7. The safety system of claim 6 wherein the braking system is configured to operate at a reaction time braking speed of approximately 1.2 meters per second.

8. The safety system of claim 2 wherein the first sensor is configured to operate within a neural network that is trained with the plurality of hand images, the plurality of hand images including one or more of hand positions, hand shapes, hand colors and hand sizes.

9. The safety system of claim 1 wherein the first region and the second region are substantially the same size.

10. The safety system of claim 1 wherein the first region and the second region are substantially the same shape.

11. The safety system of claim 1 wherein the sensor assembly is coupled to the power tool such that the sensor assembly is substantially fixed relative to the base during use of the power tool.

12. A safety system for use with a power tool that is usable by a user, the power tool including a base and a moving component that is movable relative to the base, the safety system comprising:

a sensor assembly including a first sensor and a second sensor, the first sensor monitoring a first region that is adjacent to the moving component of the power tool, and the second sensor monitoring a second region that is adjacent to the moving component of the power tool, the first region intersecting the second region to define a common region along the work surface of the base, each of the first region and the second region including a corresponding first mutually exclusive region and a second mutually exclusive region that are separate (i) from one another, and (ii) from the common region, the sensor assembly being configured to operate within a neural network that is trained with a plurality of hand images that are captured by the sensor assembly while the power tool is in a non-operating condition, the plurality of hand images including a plurality of hand positions, hand shapes, hand colors and hand sizes; and a controller that utilizes a model of a hand that is based at least in part on the plurality of hand images that are captured by the sensor assembly, the model of the hand being usable only while the power tool is in the non-operating condition.

13. The safety system of claim 12 wherein the controller includes a single board computer having one or more processors.

14. The safety system of claim 12 wherein the sensor assembly is coupled to the power tool such that the sensor assembly is substantially fixed relative to the base during use of the power tool.

15. The safety system of claim 12 wherein the controller is configured to be trained to recognize the presence of the hand within a particular region from a plurality of provided hand images that are gathered from a source other than the first sensor.

16. The safety system of claim 15 wherein the controller is configured to build a provided hand model using the plurality of provided hand images.

17. The safety system of claim 16 wherein the provided hand model is utilized to determine a plurality of key points on the hand, the plurality of key points including one or more of joint locations, fingertips, and palm markers of the hand.

18. The safety system of claim 17 wherein the plurality of key points are utilized by the provided hand model to retrain the hand model and improve the accuracy of the hand model.

19. The safety system of claim 12 wherein the first region and the second region are substantially the same size.

20. The safety system of claim 12 wherein the first region and the second region are substantially the same shape.

* * * * *